United States Patent Office 3,238,743
Patented Mar. 8, 1966

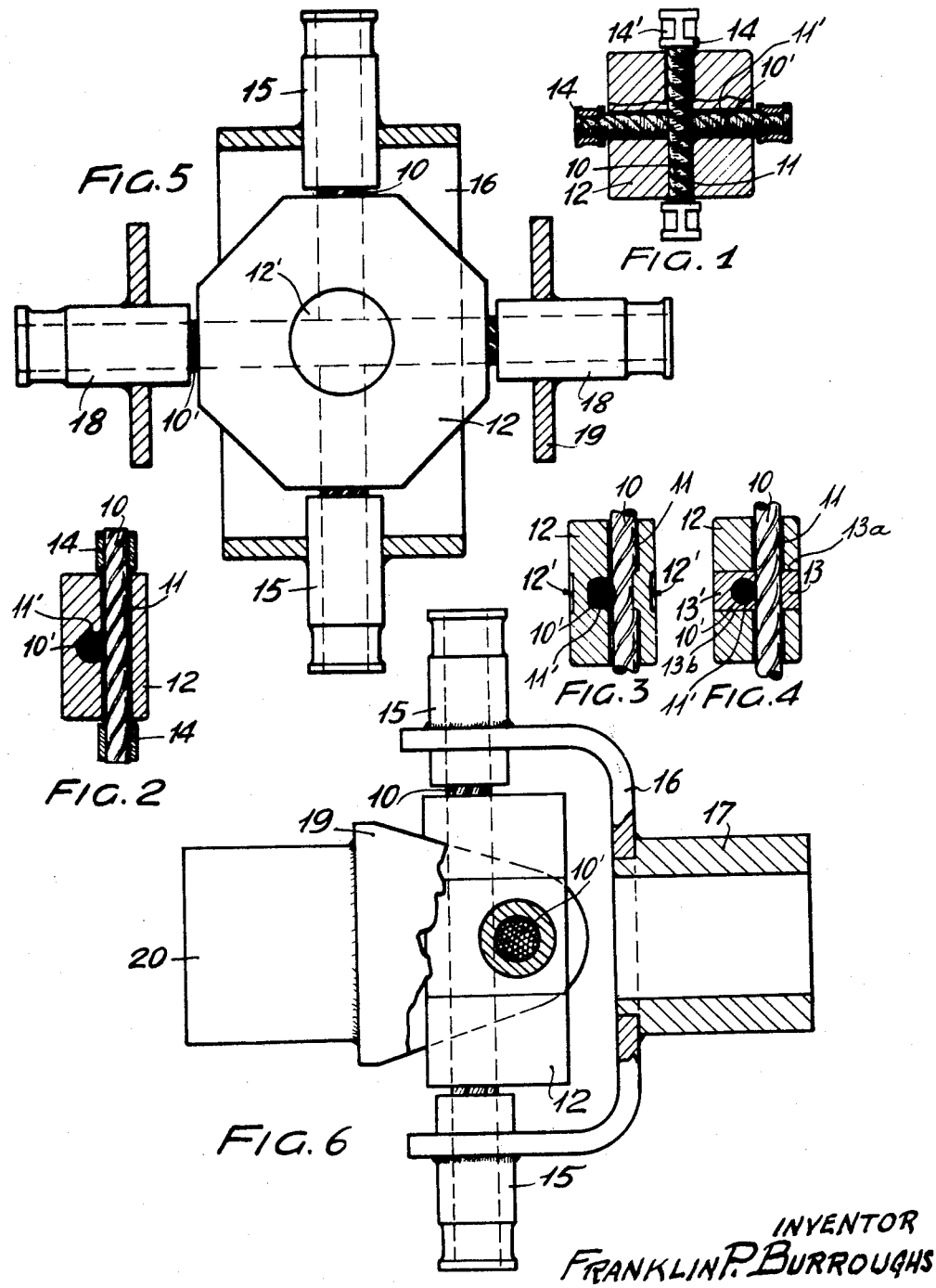

3,238,743
RESILIENT ASSEMBLAGE APT TO ABSORB VIBRATIONS OR SHOCKS AND/OR TO TRANSMIT TORQUE
Franklin P. Burroughs, Kensington, Md., assignor, by mesne assignments, to Cable Isolation Systems, Inc., New York, N.Y., a corporation of New York
Filed July 25, 1963, Ser. No. 297,720
Claims priority, application Italy, Mar. 9, 1963, 32,756
8 Claims. (Cl. 64—12)

This invention relates generally to pivotable couplings and more particularly to improvements in pivotable coupling which enable transmission of torques while resiliently absorbing vibrations and shocks.

Known resilient couplings are not practically useable in general applications requiring different anti-vibrational, anti-shock and damping characteristics and it has been heretofore necessary to choose a particularly appropriate resilient means for any single application, or for a certain group of similar uses.

The present invention provides a resilient coupling untilizing the twisting or torsional characteristics as well as the flexibility of cables, made of wires or synthetic material filaments, or the like, to obtain greater variety of performance so that one coupling or one type of coupling is more universally useable in different applications.

Accordingly, it is a primary object of the present invention to provide a pivotable resilient coupling of general application.

It is another important object of the present invention to provide a pivotable resilient coupling in the form of the universal joint for coupling shafts which are not aligned, forming an angle between them, or which are aligned and coaxial.

A further object of the invention is to provide a resilient pivotable coupling which does not require bearings or bearing surfaces.

Still another object of the invention is to provide a resilient pivotable coupling requiring little or no servicing or maintenance.

A still further object of the invention is to provide a pivotable resilient coupling which is of simple construction and economical to produce.

Other objects and advantages will become evident, to those skilled in this particular branch of the art from the following description.

To accomplish the above objects, the anti-vibrational coupling according to the invention may be constituted by at least two sections of cable, placed so as to form an angle between them, but lying in two adjacent parallel planes, and finding a seat in corresponding bores provided in a common block, said cables being bonded together at their crossing point by deforming the walls of the block or by forcing two plugs against the cables at their crossing point.

The outwardly protruding ends of the cables are encased in sleeves, and made fast thereto by compressing an annular zone of each sleeve. When the sleeves, as pairs attached to each cable section, are secured to shafts for coupled turning, the vibrations or the shocks of discontinuities of the rotational motion, whether the shafts are axially aligned or not, are absorbed in the cable between the sleeves or between each sleeve and the metallic block at the fastened crossing point of the cable sections. The absorption of vibrations and shocks in the cables is enabled by a combination of bending flexibility, resilience, and torsional twisting of the cable wires or filaments.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a horizontal section through an anchoring block according to the invention in which the cable sections are shown in elevation before securement to the block;

FIG. 2 is a section transverse to that illustrated in FIG. 1;

FIG. 3 is a fragmentary section similar to FIG. 2 showing the walls of the anchoring block deformed for anchoring the cables at their crossing point;

FIG. 4 is a view similar to FIG. 3 but showing a different mode of anchoring the cables by use of plugs;

FIG. 5 is a top plan view, partly in section, showing the block assembly of FIGS. 1 and 3 modified and completed to form a universal joint coupling; and FIG. 6 is a side elevation of the universal joint of FIG. 5 with parts shown in section.

Referring first to FIGURES 1–4, the cable sections 10 and 10' are placed within two bores or channels 11 and 11' provided in a common block 12, and perpendicular to each other but not necessarily so. The bores only partially intersect one another so that the cables received therein, at their crossing point are tangent to one another.

The cables, at their crossing point, are made fast to one another through a local flattening 12, 12', of the block walls (see FIG. 3) or by the insertion of two opposed plugs 13, 13', FIG. 4, each preferably having a diameter slightly larger than that of the holes 13a, 13b in the block walls. The plugs, which are preferably of a relatively soft metal, or alloy are forced into such holes under pressure so that their inner ends are deformed around the cables at their crossing point.

The outwardly protruding ends of the cables, which may have different lengths, are each clasped by a rather strong sleeve 14 fastened to the cable end by an annular deformation 14'. The resilient assemblage above described is ready for mounting to parts to be coupled.

In FIGURES 5 and 6 there is shown a resilient coupling similar to the assemblage above described. Sleeves 15 and 18 of greater length are substituted for sleeves 14. On one pair of sleeves 15 secured to cable 10 is anchored a fork 16, having an axial bushing 17 for securement in any conventional manner to a shaft, not shown. The pair of sleeves 18 fixed to cable 10' are secured to a similar fork 19, provided with bushing 20, coaxial in its rest position, with the bushing 17 and adapted to be secured to a second shaft to drive or be driven by the first shaft.

The cable sleeves 15 and 18 are securely bonded to their respective forks; but while such bonding in simple cases may be performed while the cables are in an inert condition, to obtain special and particular balancing effects, required under certain conditions of use, the cables are mutually twisted before their ends are bonded. Thus each end of each cable may be twisted in the same or opposite direction before bonding to the sleeve or before bonding the sleeve to the fork so that the cable will be prestressed to provide a desired condition to meet a particular usage. The length of the cable portions protruding from the common central block are calculated and chosen according to the more or less antivibrational functions required, as well as to the relevant torques.

It will be apparent from the above that a universal joint such as shown in FIGS. 5 and 6 when connected to shafts to be coupled by sockets 17 and 20 will transmit the rotation of one shaft to the other through the inherent rigidity of the two cable sections 10 and 10′. The cable sections, which are perpendicular to each other but need not be so, permit a universal connection between the two shafts. The swiveling of each shaft about the axis of its cable section is opposed by the torsional restoring force, within the cable which returns the shaft to its initial position when the swiveling force is removed. The greater the swiveling the greater the opposition, not only by the torsion but by the increased friction between the cable wires as they twist with respect to each other.

The securement of each cable section at its mid-point by means of the deformation 12′ or the insert plugs 13, 13′ causes each cable section to be twisted from its center outwardly and accordingly both ends of a cable section may be formed of wires twisted in the same direction or opposite to each other depending upon the torsion condition expected in the particular application. In addition the free portions of the cable between their centers and their ends where clamped to the sleeves 15 and 18 and particularly those portions between the anchoring block 12 and the sleeves enable the coupling to be designed to permit a certain amount of bending of the cables, the resiliency of the wires serving to return the cable sections to their initial condition when the bending forces are dissipated. It is apparent, therefore, that the universal coupling permits pivoting about two perpendicular axis as well as bending in all directions so that the coupled shafts may move in any direction with respect to each other while the inherent resiliency to flexure and torsion in the cable sections serve to oppose and dampen oscillations, shocks and vibrations.

Obviously, many changes may be made in the coupling assemblage, so that the invention should be restricted only as required by the terminology and spirit of the appended claims.

What is claimed is:

1. A resilient coupling adapted to absorb vibrations and shocks and to transmit torques and twisting forces comprising at least two straight, crossing cables having offset axis in spaced parallel planes and lying within straight channels having center lines offset from one another in spaced parallel planes within a common block, said cables being made fast to the block in at least one anchoring point, said cables having ends protruding from the block, and coupling members connected to said cable ends.

2. A resilient coupling according to claim 1, wherein said cables are made fast to said common block by local flattenings of opposing walls of the block.

3. A resilient coupling adapted to absorb vibrations and shocks, and to transmit torques and twisting forces, comprising at least two cables placed at an angle to each other within channels provided in a common block, the ends of said cables protruding from the block and being locked to sleeves which are connectable to members to be coupled, said cables being made fast to one another at least in one anchoring point, said common block being provided with holes aligned with said cable anchoring point, a pair of opposed plugs inserted in said holes, each plug having a diameter larger than that of its respective hole, and said plugs being forced into said holes to deform their inner ends around the cables.

4. A resilient coupling for transmitting torque and absorbing shock and vibration comprising a pair of bifurcated coupling members, a pair of straight, flexible cables each connected at its ends to the bifurcated portions of the same coupling member, the connected ends of one of said pair of cables lying in a different plane from the plane of the connected ends of the other of said pair of cables, said pair of cables having offset axes and crossing one another, and means connecting said cables near their crossing point without distorting their axes and forming the sole connection between said bifurcated coupling members.

5. A resilient coupling adapted to absorb vibrations and shocks and to transmit torques and twisting forces comprising at least two straight, crossing, flexible cables having offset axes and lying within straight channels in a common block, said cables being made fast to the block in at least one anchoring point, said cables having ends protruding from the block, the ends of one of said cables lying in a different plane from the plane of the ends of the other of said cables, and coupling members forming a sole means for transmitting torque connected to said cable ends for twisting said cables about their axes starting from said anchoring points.

6. A resilient coupling as set forth in claim 5 wherein said coupling members comprise sleeves locked to said cable ends.

7. A resilient coupling according to claim 6 wherein said coupling members further comprise yokes having two arms, the pair of sleeves at the ends of each cable being fixed to the arms of a yoke.

8. A resilient coupling according to claim 7 wherein said yoke is fixed to said pair of sleeves after the cable locked thereto has been prestressed by twisting.

References Cited by the Examiner

UNITED STATES PATENTS

| | | | |
|---|---|---|---|
| 1,185,208 | 5/1916 | Lapp | 64—15 |
| 1,659,353 | 2/1928 | Dwyer | 64—12 |
| 2,525,580 | 10/1950 | Beler | 64—6 |
| 2,855,767 | 10/1958 | Ahlen | 64—13 |
| 3,087,313 | 4/1963 | Kerley | 64—12 |

FOREIGN PATENTS 533,395  9/1931  Germany.

BROUGHTON G. DURHAM, *Primary Examiner.*

ROBERT C. RIORDON, *Examiner.*